March 19, 1957     W. M. HARKS     2,785,648
MULTIPLE LEVEL INDICATOR FOR A TANK VARIETY VEHICLE
Filed April 5, 1955     2 Sheets—Sheet 1

Inventor:
Walter M. Harks
By Fred Gerlach
atty.

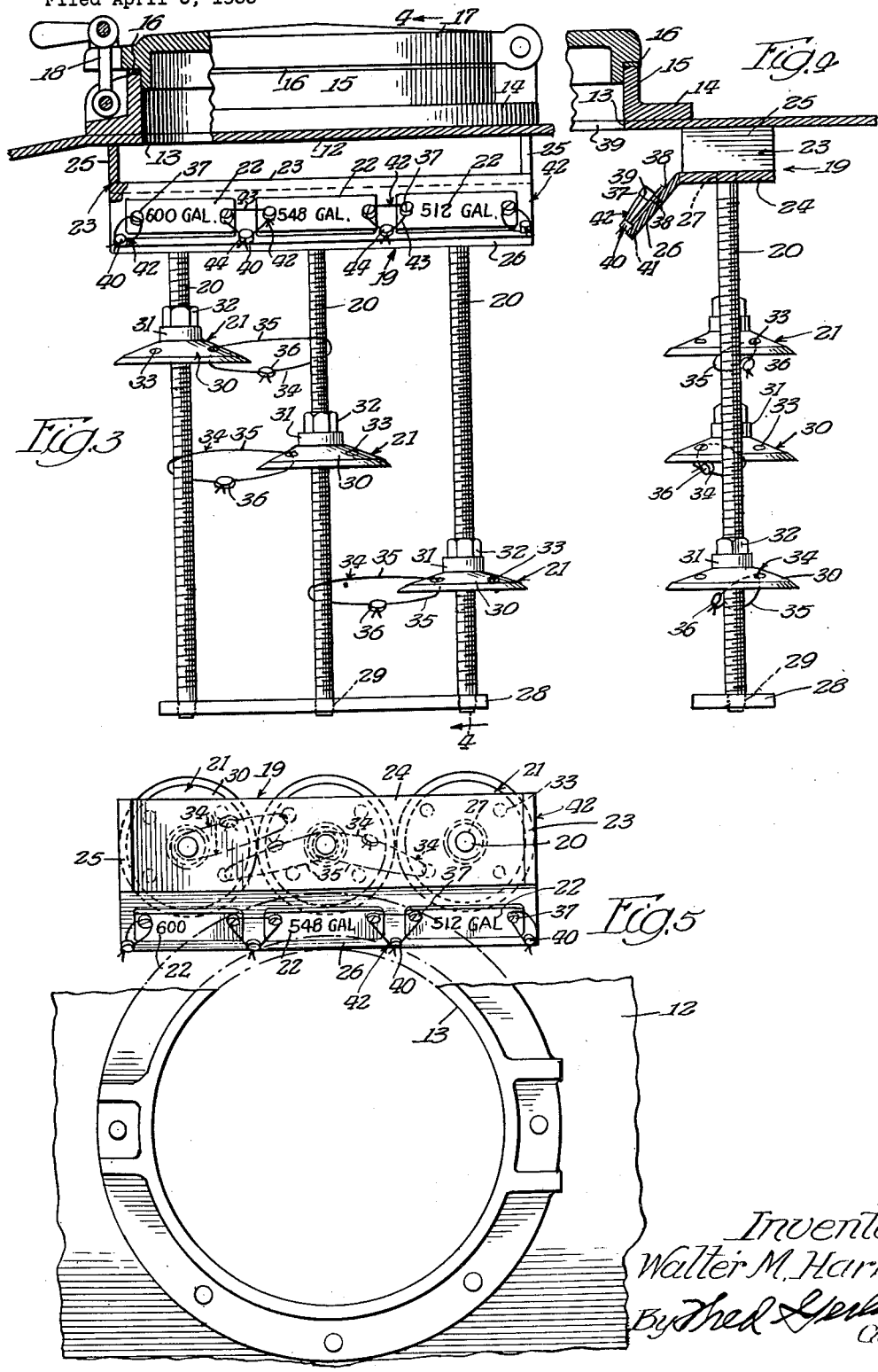

United States Patent Office 2,785,648
Patented Mar. 19, 1957

2,785,648

MULTIPLE LEVEL INDICATOR FOR A TANK VARIETY VEHICLE

Walter M. Harks, Evanston, Ill.

Application April 5, 1955, Serial No. 499,332

8 Claims. (Cl. 116—118)

The present invention relates generally to multiple level indicators. More particularly, the invention relates to that type of multiple level indicator which is designed for use in connection with a tank variety vehicle (truck or trailer) having a filling opening in the top of the tank thereof, serves to indicate different liquid levels in the tank, is disposed directly beneath the top of the tank and at one side of the filling opening, and as its components or parts comprises: (1) a mounting structure which is provided with means whereby it is fixedly attached to the superjacent portion of the top of the tank of the vehicle to which the indicator is applied; (2) a plurality of vertically extending rods which are arranged in spaced apart relation with one another and depend from the mounting structure; (3) a plurality of level indicating markers which correspond in number to, and are associated respectively with, the rods, are mounted on the rods so that they are vertically adjustable relatively thereto, and have individual means for sealing them in their adjusted positions; and (4) quantity indicating plates which correspond in number to the rods, are positioned adjacent to the upper ends of the rods respectively, and have sealable means for securing them in place.

One object of the invention is to provide a multiple level indicator which is an improvement upon, and has certain inherent advantages over, previously designed indicators of the aforementioned type and including that which is disclosed in, and forms the subject matter of, my copending application Serial No. 493,221, filed on March 9, 1955 now U. S. Patent 2,756,715.

Another object of the invention is to provide a multiple level indicator of the type under consideration in which the vertically extending spaced apart rods are connected fixedly to the mounting structure and are so positioned or arranged that they are all visible from above through the filling opening in the top of the tank of the vehicle to the end that the vertically adjustable level indicating markers thereon may readily be viewed.

Another object of the invention is to provide a multiple level indicator of the last mentioned type and character in which the rods are located in a vertically extending plane and are spaced equi-distantly apart.

A further object of the invention is to provide a multiple level indicator of the type under consideration in which the quantity indicating plates are mounted on the mounting structure.

A still further object of the invention is to provide a multiple level indicator which is generally of new and improved construction, involves a simple and novel arrangement of parts, effectively and efficiently fulfills its intended purpose, and is characterized by the fact that it is capable of being produced or fabricated at an extremely low cost.

Other objects of the invention and the various advantages and characteristics of the present multiple level indicator will be apparent from a consideration of the following detailed description.

The invention consists in the several novel features which are hereinafter set forth and are more particularly defined by claims at the conclusion hereof.

In the drawings which accompany and form a part of the present specification or disclosure and in which like numerals of reference denote corresponding parts throughout the several views:

Figure 3 is an enlarged front view of the indicator;

Figure 4 is a vertical transverse section taken on the line 4—4 of Figure 3 and illustrating in detail the construction and manner of mounting of the mounting structure of the indicator; and Figure 5 is a plan view of the indicator.

Figure 2:
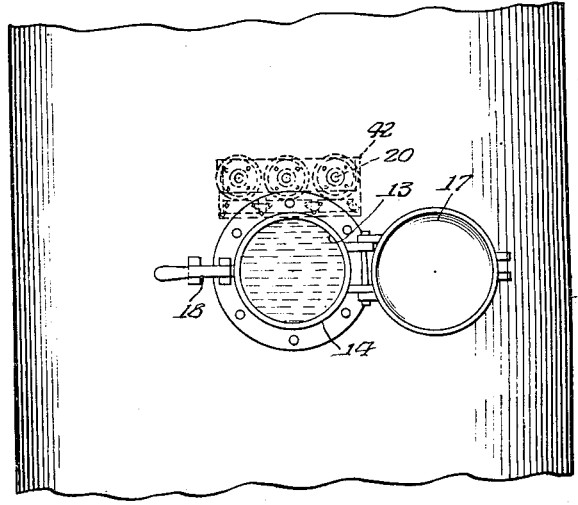
Figure 2 is a fragmentary plan view of the tank of the vehicle showing the cover for the filling opening in its open position and indicating the position of the indicator with respect to the filling opening.

The indicator which is shown in the drawings constitutes the preferred form or embodiment of the invention. It is essentially a multiple level indicator and is designed and adapted for use in connection with a tank variety vehicle 6. The latter embodies a wheel-equipped chassis 7 and a tank 8 on the chassis. It is contemplated that the vehicle may be either a tank truck or a tank trailer. The tank 8 of the vehicle 6 is designed to hold one particular petroleum product, such, for example, as gasoline, or different petroleum products, such, for example, as gasoline, kerosene and fuel oil, depending upon the use to which the vehicle is put. It extends lengthwise of the vehicle chassis and consists of a bottom wall 9, a pair of side walls 10, end walls 11 and an arched or dome-shaped top wall 12. The top wall of the tank is connected to, and extends between, the upper marginal portions of the side walls 10 and has in its central portion a circular opening 13 by which the tank interior may be filled. The filling opening 13 is reenforced by a ring 14 which is welded or otherwise fixedly secured to the upper surface of the portion of the tank top wall 12 that defines the filling opening. The inner marginal portion of the ring is provided with an integral upwardly extending annular flange 15 which is surmounted by a circular gasket 16. The filling opening 13 is closed by way of a circular cover 17 which is hinged at one portion thereof so that it is capable of swinging back and forth between a closed position wherein it rests on the gasket 16 (see Figures 3 and 4) and an open position wherein it is located at one side of the reenforcing ring 14 and exposes the filling opening as shown in Figure 2. Diametrically opposite the hinge for the cover is a bolt and lever arrangement 18 for releasably clamping or locking the cover in its closed position.

The indicator is located in the interior of the tank at a position or location at one side of the filling opening 13 and as its principal components or parts comprises a mounting structure 19, a plurality of vertically extending screw threaded rods 20, a plurality of nut type markers 21 and a plurality of quantity indicating plates 22. Generally speaking, the indicator as a whole is of unitary character.

The mounting structure 19 of the indicator is in the form of a horizontally elongated U-shaped metallic bracket 23 which is preferably positioned crosswise of the tank and consists of an intermediate part 24 and a pair of upstanding end parts 25. The end parts of the bracket are formed integrally with, and extend upwards at right angles to, the ends of the intermediate part 24 and have the top surfaces thereof welded to the superjacent portion of the tank top wall 12 to the end that the bracket is maintained in fixed relation with the tank. In addition to the bracket 23 the mounting structure 19 comprises a horizontally elongated metallic panel 26. The latter is coextensive with the intermediate part 24 of the bracket 23. It is connected to, and extends downwards at a 45° angle from, the side edge of the intermediate part 24 that is nearer the filling opening 13 in the top wall 12 of the tank. If desired, the panel 26 may be formed integrally with the intermediate part 24 or it may be formed separately from the bracket and have its upper side edge welded to the adjacent side edge of the intermediate part 24. Because of its position and angularity the panel 26 is readily visible through the filling opening 13 when the hinged cover 17 is in its opened position.

The vertically extending screw rods 20 are connected to, and depend from, the U-shaped bracket 23 of the mounting structure 19 and are preferably three in number. They may, however, be more or less in number than three depending upon how many different levels the indicator as a whole is to indicate. As shown in the drawings, the three rods are spaced equi-distantly apart and lie in a vertical plane which extends lengthwise of the bracket 23. The upper ends of the rods fit within circular holes 27 in the intermediate part 24 of the bracket 23 and are mounted in place by drive or press fits in order that the rods are in fixed or rigid relation with the bracket. The lower ends of the rods 20 are cross-connected by way of a horizontal bar 28. The latter underlies, and is spaced an appreciable distance beneath, the intermediate part 24 of the bracket 23 and has circular holes 29 in which the lower ends of the rods 20 fit snugly.

The nut type markers 21 of the indicator correspond in number to, and are associated respectively with, the vertically extending spaced apart screw threaded rods 20 and are adapted to indicate different levels and hence amounts of whatever petroleum product is carried in the tank 8 of the vehicle 6. They are preferably in the form of castings and consist of circular downwardly dished or convexo-concavo bodies 30 and internally threaded hubs 31. The hubs 31 of the markers 21 extend around, and are in screw threaded relation with, the rods 20 and cause the markers in connection with turning thereof relatively to the rods to move upwards or downwards depending upon the direction of turning movement. By turning the markers in one direction, they are adjusted upwards and by turning the markers in the opposite direction, they are adjusted downwards. The internally threaded hubs 31 of the markers 21 are surmounted by lock nuts 32. The latter extend around the rods 20 and are adapted when tightened to lock the markers in their different or various adjusted positions. When it is desired to adjust the markers with respect to the rods, the lock nuts are loosened. It is contemplated that the markers will be vertically adjusted so that they are different elevations in order that they serve to indicate different levels of whatever petroleum product is contained or carried in the tank of the vehicle. The outer marginal portions of the bodies 30 of the markers 21 are provided with annular series of equi-distantly spaced holes 33. In order to seal the markers in the various positions into which they are adjusted, each marker is provided with a wire and lead sealing device 34 consisting of a wire 35 in loop form and a lead piece 36 for securing the ends of the wire 35 together. The wire 35 of each device 34 is adapted to extend through one of the holes 33 in the body of the marker to which the device is applied, and is also adapted to extend around the rod 20 that is next to the rod on which the marker is mounted (see Figure 3). After a marker has been adjusted to the proper elevation, it is sealed in place by inserting the wire of the associated sealing device 34 through the hole 33 nearest the rod that is next to the rod on which the marker is mounted. Thereafter, the end portions of the wire are manipulated around opposite sides of the rod that is next to the rod on which the marker is mounted and then the extremities of the wire are secured together by the lead piece 36. When the devices 34 are in their operative or marker sealing position they prevent the markers from being turned relatively to the rods 20. In order again to adjust the markers, it is necessary that the lead pieces 36 be broken so as to release the ends of the wires 35. It is contemplated that the markers 21 will be adjusted and then sealed in place by way of the wire and lead sealing devices 34 by an official of the department of weights and measures having jurisdiction of the vehicle 6.

Figure 1:
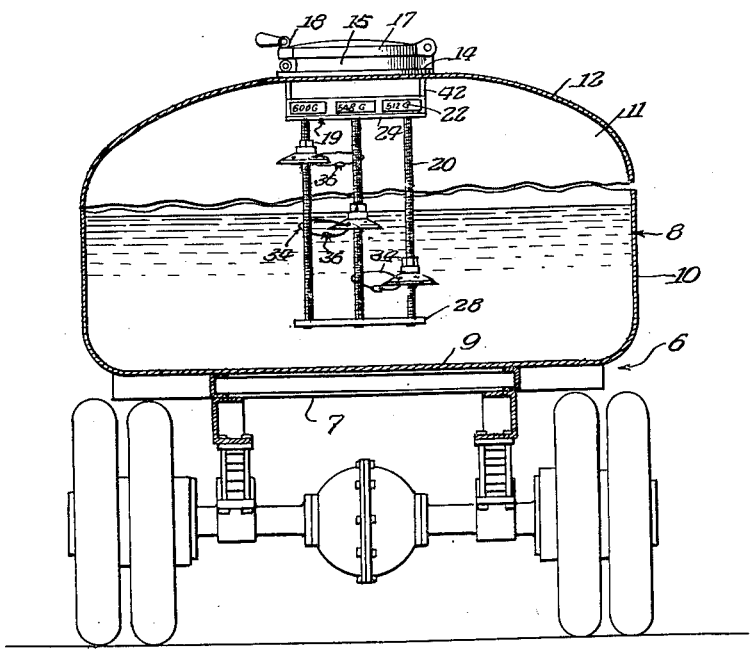
Figure 1 is a vertical transverse section of a tank variety vehicle having applied thereto a multiple level indicator embodying the invention.

The quantity indicating plates 22 of the indicator are preferably formed of soft metal so that they may be stamped with numerals signifying numbers of gallons. They are flat and correspond in number to, and are associated respectively with, the vertically extending screw threaded rods 20. As best shown in Figures 1, 3 and 5, the plates 22 are mounted on the top surface of the downwardly inclined panel 26 of the mounting structure 19 and are positioned so that they are respectively aligned with or disposed in front of the upper ends of the rods 20. Screws 37 extend through holes in the ends of the quantity indicating plates 22 and into screw threaded holes 38 in the panel 26 and serve to secure the plates in place on the panel. As best shown in Figure 4, the heads of the screws 37 are provided with transversely extending holes 39. The panel 27 is provided with studs 40 which are located adjacent to the ends of the plates 22 and have transverse holes 41 in the heads thereof. In order to seal the quantity indicating plates 22 against unauthorized removal wire and lead sealing devices 42 are provided. Each of such devices consists of a wire 43 in loop form and a lead piece 44 for securing the ends of the wire 43 together. The wires 43 of the devices 42 are adapted to extend through the transverse holes 39 in the heads of the screws 37 and also through the transverse holes 41 in the heads of the studs 40 and are adapted after being threaded through such holes to have their ends connected together by the lead pieces 44. When the devices 42 are in their operative positions, they serve to seal the screws 37 against turning and thus form seals for the quantity indicating plates 22. Each plate 22 is adapted to have stamped in it the number of gallons for which the subjacent marker 21 is set or adjusted to indicate. It is contemplated that the plates 22 will be stamped and also sealed in place by way of the wire and lead sealing devices 42 by an official of the department of weights and measures having jurisdiction of the vehicle 6.

Assuming that the tank variety vehicle 6 is to be used in intrastate commerce or transportation only and is to be used periodically to transport or haul gasoline, kerosene and fuel oil and according to the weight laws and regulations of the State in which the vehicle is to be used, the axle weight load of the vehicle is the maximum when the tank is filled with 600 gallons of gasoline, the indicator is set by adjusting the left hand marker as viewed in Figure 3 towards the top of its associated rod and until it is at an elevation corresponding to the top level of 600 gallons of gasoline in the tank 8. As soon as the left hand marker is properly adjusted, the official of the department of weights and measures having jurisdiction of the vehicle seals the marker in place by way of one of the wire and lead sealing devices 34. After sealing of the left hand marker, the official stamps on the superjacent quantity indicating plate 22 the legend "600 Gal." and seals such plate in place by certain of the wire and lead sealing devices 42. Following setting and sealing of the left hand marker, the intermediate marker is adjusted so as to indicate the permissible full load capacity of the tank when the latter is filled with kerosene. Because kerosene has a higher specific gravity than gasoline, the intermediate marker is adjusted to a lower elevation than the marker that indicates when the tank is filled with 600 gallons of gasoline. The weight of 548 gallons of kerosene is approximately equal to the weight of 600 gallons of gasoline. Therefore, the intermediate marker is adjusted to an elevation corresponding to the level of 548 gallons of kerosene in the tank of the vehicle.

After proper adjustment of the intermediate marker the official of the department of weights and measures of the State having jurisdiction of the vehicle seals the intermediate marker in place by another of the wire and lead sealing devices 34 and then marks the superjacent quantity indicating plate 22 with the legend "548 Gal." and seals the screws for such plate by way of other of the wire and lead sealing devices 42. After setting and sealing of the intermediate marker the right hand marker is adjusted to indicate the permissible full load capacity of the tank when the tank is filled with fuel oil. Because fuel oil has a higher specific gravity than kerosene, the right hand marker is adjusted to a lower elevation than the intermediate marker that indicates when the tank is filled with 548 gallons of kerosene. The weight of 512 gallons of fuel oil is approximately equal to the weight of 600 gallons of gasoline or 548 gallons of kerosene. Therefore, the right hand marker is adjusted to an elevation corresponding to the level of 512 gallons of fuel oil in the tank of the vehicle. After proper adjustment of the right hand marker the official of the department of weights and measures of the State having jurisdiction of the vehicle seals the marker in place by the third wire and lead sealing device 34 and then stamps the superjacent quantity indicating plate 22 with the legend "512 Gal." and seals the screws for such plate by way of other of the wire and lead sealing devices 42. When the three markers of the indicator are set and sealed as heretofore pointed out, the left hand marker will indicate when the tank is filled with 600 gallons of gasoline, the intermediate marker will indicate when the tank is filled with 548 gallons of kerosene and the right hand marker will indicate when the tank is filled with 512 gallons of fuel oil. By using the three markers in connection with periodic or intermittent use of the tank for gasoline, kerosene or fuel oil, the operator will not overload the tank so that the axle weight load of the vehicle is in excess of the legal maximum as comprehended by the laws or regulations of the State having jurisdiction of the vehicle.

If the vehicle 6 is to be used in interstate commerce to carry but one kind of fuel, such, for example, as gasoline and the States in which the vehicle is to travel have different maximum axle weight loads, say, 600 gallons in one State, 550 gallons in another State and 500 gallons in a third State, one of the markers will be set and sealed at a height corresponding to a 600 gallon level and the superjacent quantity indicating plate will be marked with the legent "600 Gal." the second marker will be set and sealed at a height corresponding to the level of 550 gallons of gasoline and the superjacent plate 22 will be marked with the legend "550 Gal." and the third marker will be set and sealed at a height corresponding to the level of 500 gallons of gasoline and the superjacent quantity indicating plate will be marked with the legend "500 gal." When the three markers are so set and sealed, the operator of the vehicle can adjust the quantity of gasoline in the tank 8 so that it does not exceed the maximum permissible weight comprehended by the weight laws or regulations of the State in which the vehicle is at the time traveling.

The herein described multiple level indicator due to its particular construction and arrangement of parts effectively and efficiently fulfills its intended purpose and is capable of being produced at a comparatively low cost. It is capable of being readily adjusted and when its markers are adjusted and sealed in place and its quantity indicating plates are sealed is tamperproof.

The invention is not to be understood as restricted to the details set forth since they may be modified within the scope of the appended claims without departing from the spirit and scope of the invention.

Having thus described the invention what I claim as new and desire to secure by Letters Patent is:

1. In combination with a tank variety vehicle having a filling opening in the top of the tank thereof, a multiple level indicator disposed directly beneath the top of the tank and at one side of but out of vertical registry with the filling opening and comprising a bracket having means whereby it is attached directly to the superjacent portion of the top of the tank, a plurality of vertically extending spaced apart rods connected to, and depending from, the bracket and arranged so that all of them are visible from above through said filling opening, and level indicating markers corresponding in number to, and associated respectively with, the rods and mounted on said rods so that they are adjustable vertically relatively thereto.

2. In combination with a tank variety vehicle having a filling opening in the top of the tank thereof, a multiple level indicator disposed directly beneath the top of the tank and at one side of but out of vertical registry with the filling opening and comprising a bracket having means whereby it is attached to the superjacent portion of the top of the tank, a plurality of vertically extending non-rotatable screw threaded rods spaced equidistantly apart, connected fixedly to, and depending from, the bracket and arranged so that they lie in a vertical plane and all of them are visible from above through said filling opening, nut type level indicating markers corresponding in number to, and mounted respectively on, the rods and adapted to be vertically adjusted by turning them relatively to the rods, and a straight horizontally extending bar extending across, and connected fixedly to, the lower ends of said rods.

3. In combination with a tank variety vehicle having a filling opening in the top of the tank thereof, a multiple level indicator disposed directly beneath the top of the tank and at one side of but out of vertical registry with the filling opening and comprising a horizontally elongated U-shaped bracket consisting of an intermediate part and upstanding end parts and having the upper surfaces of its end parts attached to the superjacent portion of the top of the tank and its intermediate part provided with a longitudinal series of equidistantly spaced holes, a plurality of vertically extending spaced apart rods corresponding in number to the holes, positioned in depending relation with the bracket, and having the upper ends thereof fitting snugly in said holes respectively, and level indicating markers corresponding in number to, and associated respectively with, the rods and mounted on said rods so that they are adjustable vertically relatively thereto.

4. In combination with a tank variety vehicle having a filling opening in the top of the tank thereof, a multiple level indicator disposed directly beneath the top of the tank and at one side of but out of vertical registry with the filling opening and comprising a bracket having means whereby it is attached to the superjacent portion of the top of the tank, a plurality of vertically extending spaced apart rods connected to, and depending from, the bracket and arranged so that all of them are visible from above through said filling opening, level indicating markers corresponding in number to, and associated respectively with, the rods, mounted on said rods so that they are adjustable vertically relatively thereto, and provided with releasable and sealable means for retaining them in their various adjusted positions, and quantity indicating plates corresponding in number to the rods, mounted directly on the bracket so that they are visible from above through said filling opening and also so that they are positioned respectively adjacent to the upper ends of the rods, and provided with sealable means for securing them in place.

5. In combination with a tank variety vehicle having a filling opening in the top of the tank thereof, a multiple level indicator disposed directly beneath the top of the tank and at one side of the filling opening and comprising a horizontally elongated bracket having means whereby it is attached to the superjacent portion of the tank and embodying a longitudinally extending downwardly inclined panel arranged so that it is visible from above through the filling opening, a plurality of vertically extending rods spaced equidistantly apart, connected to, and depending from, the bracket, lying in a plane that extends lengthwise of the bracket, and arranged so that all of them are visible from above through said filling opening, level indicating markers corresponding in number to, and associated respectively with, the rods and mounted on said rods so that they are adjustable vertically thereto, and quantity indicating plates corresponding in number to the rods, and mounted on said panel so that they are positioned respectively adjacent to the upper ends of the rods.

6. In combination with a tank variety vehicle having a filling opening on the top of the tank thereof, a multiple level indicator disposed directly beneath the top of the tank and at one side of the filling opening and comprising a horizontally elongated bracket having means whereby it is attached to the superjacent portion of the tank and provided along the side margin thereof that is nearer the opening with a longitudinally extending downwardly inclined panel that is visible from above through the filling opening, a plurality of vertically extending rods spaced equidistantly apart, connected to, and depending from, the bracket, lying in a plane extending lengthwise of the bracket, and arranged so that all of them are visible from above through said filling opening, level indicating markers corresponding in number to, and associated respectively with, the rods, mounted on said rods so that they are adjustable vertically relatively thereto, and provided with releasable and sealable means for retaining them in their various adjusted positions, and quantity indicating plates corresponding in number to the rods, mounted on the panel so that they are positioned respectively adjacent to the upper ends of the rods, and provided with sealable means for securing them in place.

7. In combination with a tank variety vehicle having a substantially circular filling opening on the top of the tank thereof, a unitary multiple level indicator disposed directly beneath the top of the tank and at one side of the filling opening and comprising a horizontally elongated U-shaped bracket positioned substantially tangentially with respect to the filling opening, consisting of an intermediate part and upstanding end parts, having the upper surfaces of its end parts attached to the superjacent portion of the top of the tank and its intermediate part provided with a longitudinal series of equidistantly spaced holes, and provided on the side margin of its intermediate part that is nearer the filling opening with a longitudinally extending downwardly inclined panel that is visible from above through said filling opening, a plurality of vertically extending spaced apart rods corresponding in number to the holes, positioned in depending relation with the bracket, and having the upper ends thereof fitting in said holes respectively, level indicating markers corresponding in number to, and associated respectively with, the rods and mounted on said rods so that they are adjustable vertically relatively thereto, and quantity indicating plates corresponding in number to the rods, and mounted on the panel so that they are positioned respectively adjacent to the upper ends of the rods.

8. In combination with a tank variety vehicle having a substantially circular filling opening on the top of the tank thereof, a unitary multiple level indicator disposed directly beneath the top of the tank and at one side of the filling opening and comprising a horizontally elongated U-shaped bracket positioned substantially tangentially with respect to the filling opening, consisting of an intermediate part and upstanding end parts, having the upper surfaces of its end parts attached to the superjacent portion of the top of the tank and its intermediate part provided with a longitudinal series of equidistantly spaced holes, and provided on the side margin of its intermediate part that is nearer the filling opening with a longitudinally extending downwardly inclined panel that is visible from above through said filling opening, a plurality of vertically extending non-rotatable spaced apart screw threaded rods corresponding in number to the holes, positioned in depending relation with the bracket, and having the upper ends thereof fitting snugly in said holes respectively, nut type level indicating markers corresponding in number to, and mounted respectively on, the rods, adapted to be vertically adjusted by turning them relatively to the rods, and provided with releasable and sealable means for retaining them in their various adjusted positions, a straight horizontally extending bar extending across, and connected fixedly to, the lower ends of said rods, and quantity indicating plates corresponding in number to the rods, mounted on the panel so that they are positioned respectively adjacent to the upper ends of the rods, and provided with sealable means for securing them in place.

References Cited in the file of this patent
UNITED STATES PATENTS 2,623,492    Rath   ------------------ Dec. 30, 1952